United States Patent
Behm et al.

(10) Patent No.: US 10,142,111 B2
(45) Date of Patent: *Nov. 27, 2018

(54) BINDING DIGITALLY SIGNED REQUESTS TO SESSIONS

(71) Applicant: Amazon Technologies, Inc., Seattle, WA (US)

(72) Inventors: Bradley Jeffery Behm, Seatttle, WA (US); Gregory Branchek Roth, Seattle, WA (US); Gregory Alan Rubin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,003

(22) Filed: Oct. 2, 2017

(65) Prior Publication Data
US 2018/0026797 A1    Jan. 25, 2018

Related U.S. Application Data

(63) Continuation of application No. 14/569,596, filed on Dec. 12, 2014, now Pat. No. 9,780,952.

(51) Int. Cl.
*H04L 29/06* (2006.01)
*H04L 9/32* (2006.01)
*H04L 9/08* (2006.01)

(52) U.S. Cl.
CPC .......... *H04L 9/3247* (2013.01); *H04L 9/0841* (2013.01); *H04L 9/3263* (2013.01); *H04L 63/08* (2013.01); *H04L 63/0823* (2013.01); *H04L 63/1466* (2013.01); *H04L 63/166* (2013.01)

(58) Field of Classification Search
None
See application file for complete search history.

(56) References Cited

U.S. PATENT DOCUMENTS

| | | | |
|---|---|---|---|
| 6,836,765 B1 | 12/2004 | Sussman | |
| 6,952,768 B2 * | 10/2005 | Wray | H04L 9/0841 713/152 |
| 7,334,125 B1 * | 2/2008 | Pellacuru | H04L 9/083 380/277 |
| 8,181,035 B1 | 5/2012 | Fernandez Gutierrez | |
| 8,458,462 B1 * | 6/2013 | Hanna | H04L 63/10 713/156 |

(Continued)

OTHER PUBLICATIONS

Computer Desktop Encyclopedia definition of "processor": http://lookup.computerlanguage.com/host_app/search?cid=C999999&term=processor&lookup.x=0&lookup.y=0.*

(Continued)

*Primary Examiner* — Jeremiah L Avery
(74) *Attorney, Agent, or Firm* — Davis Wright Tremaine LLP

(57) ABSTRACT

A client establishes an cryptographically protected communications session and determines information usable to distinguish the session from other sessions. The client digitally signs the information using a cryptographic key that is independent of the session to enable a server to check whether the information matches the session that it established and whether the digital signature is correct. The server may perform mitigating operations if either or both of the information or the digital signature is/are invalid.

20 Claims, 9 Drawing Sheets

(56) References Cited

U.S. PATENT DOCUMENTS

| | | | | |
|---|---|---|---|---|
| 9,002,018 | B2* | 4/2015 | Wilkins | H04L 9/006 380/281 |
| 9,021,255 | B1* | 4/2015 | Aharoni | H04L 29/06 713/155 |
| 2002/0147920 | A1* | 10/2002 | Mauro | G06Q 20/367 726/26 |
| 2004/0243978 | A1 | 12/2004 | Walmsley | |
| 2005/0050362 | A1 | 3/2005 | Peles | |
| 2005/0120203 | A1* | 6/2005 | Yeh | H04L 63/062 713/156 |
| 2005/0144437 | A1 | 6/2005 | Ransom et al. | |
| 2005/0148323 | A1* | 7/2005 | Little | H04L 12/66 455/414.1 |
| 2006/0294366 | A1* | 12/2006 | Nadalin | H04L 63/061 713/156 |
| 2009/0106557 | A1* | 4/2009 | Leonard | H04L 51/12 713/179 |
| 2011/0010543 | A1* | 1/2011 | Schmidt | H04W 12/10 713/168 |
| 2011/0087882 | A1 | 4/2011 | Kuo et al. | |
| 2012/0166818 | A1 | 6/2012 | Orsini et al. | |
| 2012/0167162 | A1* | 6/2012 | Raleigh | G06F 21/57 726/1 |
| 2014/0068252 | A1 | 3/2014 | Maruti et al. | |
| 2014/0189808 | A1* | 7/2014 | Mahaffey | H04L 63/083 726/4 |
| 2014/0237614 | A1 | 8/2014 | Irvine | |
| 2015/0319149 | A1* | 11/2015 | Alshammari | H04L 9/0869 713/171 |

OTHER PUBLICATIONS

Juels, Ari et al. Security and Privacy Issues in E-Passports. First International Conference on Security and Privacy for Emerging Areas in Communications Networks (SECURECOMM'05). https://ieeexplore.ieee.org/stamp/stamp.jsp?tp=&arnumber=1607561 (Year: 2005).*
Khatib, Mounis et al. An On-Demand Key Establishment Protocol for MANETs. 20th International Conference on Advanced Information Networking and Applications, vol. 1 (AINA '06). https://ieeexplore.ieee.org/stamp/stamp.jsp?tp=&arnumber=1620504 (Year: 2006).*
Gutmann, P., "Encrypt-then-MAC for Transport Layer Security (TLS) and Datagram Transport Layer Security (DTLS)," Request for Comments: 7366, Standards Track, Sep. 2014, 7 pages.
Merkle, J. et al., "Elliptic Curve Cryptography (ECG) Brainpool Curves for Transport Layer Security (TLS)," Request for Comments: 7027, Informational, Oct. 2013, 10 pages.
McGrew, D. et al., "AES-CCM Cipher Suites for Transport Layer Security (TLS)," Request for Comments: 6655, Standards Track, Jul. 2012, 8 pages.
Salter, M. et al., "Suite B Profile for Transport Layer Security (TLS)," Request for Comments: 6460, Informational, Jan. 2012, 14 pages.
Kanno, S. et al., "Addition of the Camellia Cipher Suites to Transport Layer Security (TLS)," Request for Comments: 6367, Informational, Sep. 2011, 8 pages.
Rescorla, E. et al., "Datagram Transport Layer Security Version 1.2," Request for Comments: 6347, Standards Track, Jan. 2012, 32 pages.
Kim, W. et al., "Addition of the ARIA Cipher Suites to Transport Layer Security (TLS)," Request for Comments: 6209, Informational, Apr. 2011, 9 pages.
Turner, S. et al., "Prohibiting Secure Sockets Layer (SSL) Version 2.0," Request for Comments: 6176, Standards Track, Mar. 2011, 4 pages.
Mavrogiannopoulos N. et al., "Using OpenPGP Keys for Transport Layer Security (TLS) Authentication," Request for Comments: 6091, Informational, Feb. 2011, 9 pages.

Eastlake, E., "Transport Layer Security (TLS) Extensions: Extension Definitions," Request for Comments: 6066, Standards Track, Jan. 2011, 25 pages.
Tuexen, M. et al., "Datagram Transport Layer Security (DTLS) for Stream Control Transmission Protocol (SCTP)," Request for Comments: 6083, Standards Track, Jan. 2011, 9 pages.
Kato, A. et al., "Camellia Cipher Suites for TLS," Request for Comments: 5932, Standards Track, Jun. 2010, 6 pages.
Brown, M. et al., "Transport Layer Security (TLS) Authorization Extensions," Request for Comments: 5878, Experimental, May 2010, 19 pages.
McGrew, D. et al., "Datagram Transport Layer Security (DTLS) Extension to Establish Keys for the Secure Real-time Transport Protocol (SRTP)," Request for Comments: 5764, Standards Track, May 2010, 26 pages.
Rescorla, E. et al., "Transport Layer Security (TLS) Renegotiation Indication Extension," Request for Comments: 5746, Standards Track, Feb. 2010, 15 pages.
Rescorla, E., "TLS Elliptic Curve Cipher Suites with SHA-256/384 and AES Galois Counter Mode (GCM)," Request for Comments: 5289, Informational, Aug. 2008, 6 pages.
Salowey, J., "AES Galois Counter Mode (GCM) Cipher Suites for TLS," Request for Comments: 5288, Standards Track, Aug. 2008, 8 pages.
Dierks, T. et al., "The Transport Layer Security (TLS) Protocol Version 1.2," Request for Comments: 5246, Standards Track, Aug. 2008, 104 pages.
Phelan, T., "Datagram Transport Layer Security (DTLS) over the Datagram Congestion Control Protocol (DCCP)," Request for Comments: 5238, Standards Track, May 2008, 10 pages.
Mavrogiannopoulos, N., "Using OpenPGP Keys for Transport Layer Security (TLS) Authentication," Request for Comments: 5081, Experimental, Nov. 2007, 8 pages.
Salowey, J. et al., "Transport Layer Security (TLS) Session Resumption without Server-Side State," Request for Comments: 5077, Standards Track, Jan. 2008, 20 pages.
Taylor, D. et al., "Using the Secure Remote Password (SRP) Protocol for TLS Authentication," Request for Comments: 5054, Informational, Nov. 2007, 24 pages.
Blumenthal, U. et al., "Pre-Shared Key (PSK) Ciphersuites with NULL Encryption for Transport Layer Security (TLS)," Request for Comments: 4785, Standards Track, Jan. 2007, 5 pages.
Santesson, S. et al., "TLS User Mapping Extension," Request for Comments: 4681, Standards Track, Oct. 2006, 11 pages.
Santesson, S., "TLS Handshake Message for Supplemental Data," Request for Comments: 4680, Standards Track, Sep. 2006, 9 pages.
Blake-Wilson, S. et al., "Elliptic Curve Cryptography (ECC) Cipher Suites for Transport Layer Security (TLS)," Request for Comments: 4492, Informational, May 2006, 35 pages.
Blake-Wilson, S. et al., "Transport Layer Security (TLS) Extensions," Request for Comments: 4366, Standards Track, Apr. 2006, 30 pages.
Rescorla, E. et al., "Datagram Transport Layer Security," Request for Comments: 4347, Standards Track, Apr. 2006, 25 pages.
Eronen, P. et al., "Pre-Shared Key Ciphersuites for Transport Layer Security (TLS)," Request for Comments: 4279, Standards Track, Dec. 2005, 15 pages.
Ford-Hutchinson, P., "Securing FTP with TLS," Request for Comments: 4217, Standards Track, Oct. 2005, 29 pages.
Lee, H.J. et al., "Addition of SEED Cipher Suites to Transport Layer Security (TLS)," Request for Comments: 4162, Standards Track, Aug. 2005, 6 pages.
Moriai, S. et al., "Addition of Camellia Cipher Suites to Transport Layer Security (TLS)," Request for Comments: 4132, Standards Track, Jul. 2005, 7 pages.
Friend, R., "Transport Layer Security (TLS) Protocol Compression Using Lempel-Ziv-Stac (LZS)," Request for Comments: 3943, Informational, Nov. 2004, 13 pages.
Hollenbeck, S., "Transport Layer Security Protocol Compression Methods," Request for Comments: 3749, Standards Track, May 2004, 8 pages.

(56) References Cited

OTHER PUBLICATIONS

Blake-Wilson, S. et al., "Transport Layer Security (TLS) Extensions," Request for Comments: 3546, Standards Track, Jun. 2003, 29 pages.
Chown, P., "Advanced Encryption Standard (AES) Ciphersuites for Transport Layer Security (TLS)," Request for Comments: 3268, Standards Track, Jun. 2002, 7 pages.
Hoffman, P., "SMTP Service Extension for Secure SMTP over Transport Layer Security," Request for Comments: 3207, Standards Track, Feb. 2002, 9 pages.
Dierks, T. et al., "The TLS Protocol Version 1.0," Request for Comments: 2246, Standards Track, Jan. 1999, 80 pages.
Newman, C., "Using TLS with IMAP, POP3 and ACAP," Request for Comments: 2595, Standards Track, Jun. 1999, 15 pages.
Medvinsky, A. et al., "Addition of Kerberos Cipher Suites to Transport Layer Security (TLS)," Request for Comments: 2712, Standards Track, Oct. 1999, 7 pages.
Khare, R. et al., "Upgrading to TLS Within HTTP/1.1," Request for Comments: 2817, Standards Track, May 2000, 13 pages.
Rescorla, E., "HTTP Over TLS," Request for Comments: 2818, Informational, May 2000, 7 pages.
Dang, Q., "Recommendation for Applications Using Approved Hash Algorithms," National Institute of Standards and Technology (NIST) Special Publication 800-107 Revision 1, Aug. 2012, 25 pages.
Roth, G.B., and E.J. Brandwine, "Dynamic Response Signing Capability in a Distributed System," U.S. Appl. No. 14/318,457, filed Jun. 27, 2014.
Kent, S., "Privacy Enhancement for Internet Electronic Mail: Part II: Certificate-Based Key Management," Networking Working Group, Request for Comments: 1422, Feb. 1993, 32 pages.
Cooper, M., et al., "Internet X.509 Public Key Infrastructure: Certification Path Building," Request for Comments: 4158, Informational, Sep. 2005, 81 pages.
Cooper, D., et al., "Internet X.509 Public Key Infrastructure Certificate and Certificate Revocation List (CRL) Profile," Request for Comments: 5280, Standards Track, 141 pages.
Zargar et al., A Survey of Defense Mechanisms Against Distributed Denial of Service (DDoS) Flooding Attacks, IEEE Communications Surveys & Tutorials 15(4), plublished 2013, retried from http://ieeexplore.ieee.org/stamp/stamp.isp?arnumber=6489876, 24 pages.
Pukkawanna et al., "Classification of SSL Servers based on their SSL Handshake for Automated Security Assessment," 2014 Third International Workshop on Building Analysis Datasets and Gathering Experience Returns for Security, retrieved from http://ieeexplore.ieee.org/stamp/stamp.jsp?arnumber=7446033, 10 pages.

\* cited by examiner

BINDING DIGITALLY SIGNED REQUESTS TO SESSIONS

CROSS REFERENCE TO RELATED APPLICATION

This application is a continuation of and claims priority to U.S. patent application Ser. No. 14/569,596, filed Dec. 12, 2014, entitled "BINDING DIGITALLY SIGNED REQUESTS TO SESSIONS," and is incorporated by reference for all purposes. This application incorporates by reference for all purposes the full disclosure of co-pending U.S. patent application Ser. No. 14/569,608, filed Dec. 12, 2014, entitled "CERTIFICATE ECHOING FOR SESSION SECURITY".

BACKGROUND

Data security is of high importance in many contexts. As an example, organizations often utilize networks of computing devices to provide a robust set of services to their users and the services may utilize multiple different servers. Networks often span multiple geographic and other boundaries and often connect with other networks. An organization, for example, may support its operations using both internal networks of computing resources and computing resources managed by others. Computers of the organization may communicate with computers of other organizations to access and/or provide data while using services of another organization. In many instances, organizations configure and operate remote networks using hardware managed by other organizations, thereby reducing infrastructure costs and achieving other advantages. Further, organizations often have employees with flexible working arrangements which allows for use of organizational computing resources (e.g., servers) both within an internal network and form other locations where communications must traverse a public network, such as the Internet. With such configurations of computing resources, ensuring that access to the resources and the security of the data they hold can be challenging, especially as the size and complexity of such configurations grow.

Many techniques have been developed to enhance data security. For example, Secure Sockets Layer (SSL) Transport Layer Security (TLS) and other protocols allow secure communications over a network between computer systems using symmetric cryptographic keys. Such protocols, however, often involve various disadvantages. For example, handshake processes often involve significant computational resources, which ties up processing capacity and introduces additional latency into communications. Further, network boundaries often create issues whereby, when a computer moves from one network to another, sessions need to be renegotiated. While such techniques generally provide stronger assurances of data security, conventional implementations of such techniques can be subject to various attacks. In some examples, a man-in-the-middle can successful establish concurrent SSL/TLS sessions to provide the man-in-the-middle the ability to intercept communications from one entity to the other, decrypt the intercepted communications, and reencrypt the communications. While various techniques have been developed to guard against such men-in-the-middle, the ways in which men-in-the-middle operate become increasingly sophisticated.

BRIEF DESCRIPTION OF THE DRAWINGS

Various embodiments in accordance with the present disclosure will be described with reference to the drawings, in which.

DETAILED DESCRIPTION

Figure 1:
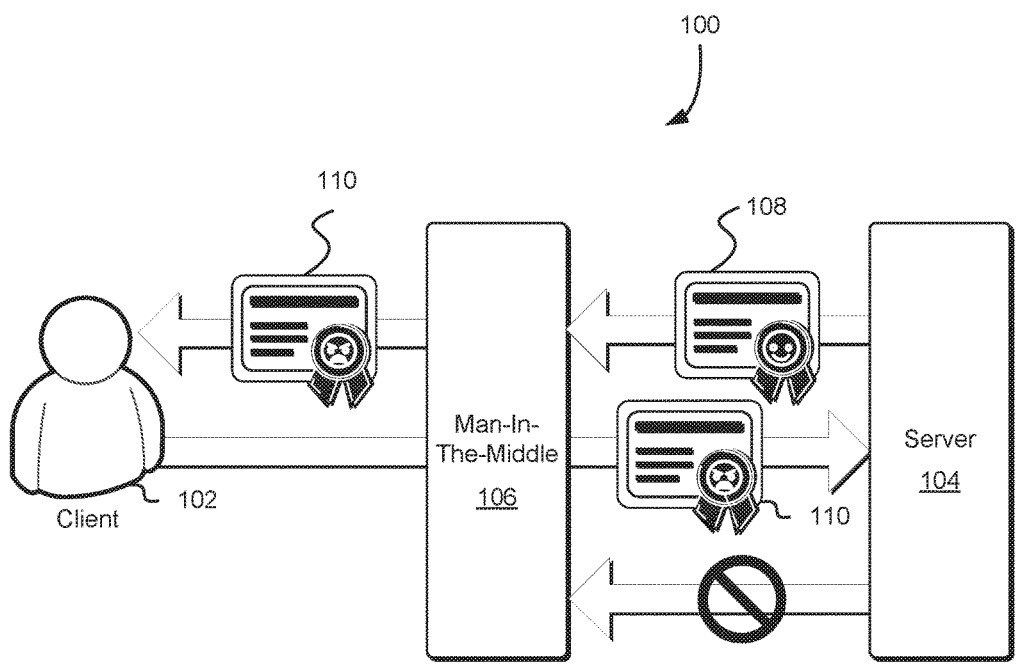
FIG. 1 shows an illustrative example of an environment in which various embodiments may be practiced.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include man-in-the-middle detection by securely echoing digital certificates used in establishment of encrypted communications sessions in a manner that prevents unauthorized men-in-the-middle from avoiding detection. In an embodiment, a client and a server establish an encrypted communications session, such as a secure sockets layer (SSL) or transport layer security (TLS) session which may be compactly referred to as a "session." As part of establishment of the session, the server may provide a digital certificate to the client, where the digital certificate encodes a public cryptographic key that the client can use to encrypt information for establishing the session to the server. In various embodiments, the client provides information to the server that indicates to the server the certificate that the client received. The server then uses that information to determine whether the client received the digital certificate that the server provided, or another certificate, such as one a man-in-the-middle used to replace the server certificate. Example information that can be used includes, but is not limited to, a fingerprint of the digital certificate, information derived from the digital certificate (e.g., a hash of the digital certificate not characterized as a fingerprint), or a copy of the digital certificate itself.

To prevent a man-in-the-middle from tampering with the information from the client about the digital certificate the client received, the client may make the information cryptographically verifiable by the server. In some examples, the client has a cryptographic key registered with the server. The cryptographic key may be, for instance, a symmetric cryptographic key maintained by the server (or another component distributed computer system of which the server is a component) and the client as a shared secret, although asymmetric keys registered with the server are also considered as being within the scope of the present disclosure. This registration may have occurred at a previous time and/or outside of a handshake process performed with the server, thereby preventing the man-in-the-middle from having access to the cryptographic key. The client may use the cryptographic key to digitally sign or otherwise render cryptographically verifiable the information about the digital certificate that it received and provide that information to the server.

The server may receive the information from the client to verify both that the client received the same digital certificate that the server provided and that the information is authentic (i.e., that the information was indeed provided by the client and not by a man-in-the-middle). The server may, for instance, verify a digital signature of the information using a copy of a cryptographic key registered in association with the client. If the information is both correct and authentic, the server may operate in accordance with trust of the encrypted communications session that was established by, for instance, providing information to the client over the established session. If, however, the information is either incorrect or inauthentic (possibly both), the server may operate accordingly to prevent unauthorized access to data. The server may, for instance, terminate the encrypted communications session, deny any requests received over the session, transmit notifications, and/or perform other mitigating operations to enhance data security.

The manner in which the client transmits the information may vary in accordance with various embodiments. In some examples, the client provides the information in a request or otherwise with a request. The digital signature may be generated so as to be generated over the information for verification by the server. The request may be one whose fulfillment has a primary purpose different from verification of the information. For instance, the request may be a request whose fulfillment includes retrieving data from storage. The server may be programmed to require verification and authentication of the information as a prerequisite for fulfilling the request. In other examples, a request is specifically configured for the purpose of verifying the information. Such a request may be referred to as a certificate health request, which may be a request configured to cause the server to verify a certificate that the client received. Such a request may be, generally, any request configured to cause such a verification and, in some embodiments, is a request not requiring confidentiality (e.g., due to the potential existence of a man-in-the-middle intercepting communications).

Other techniques of the present disclosure serve to bind requests to the encrypted communications sessions over which the requests were submitted. In an embodiment, a client is configured to determine information that is specific to an encrypted communications session. The information may be information used in the establishment of the encrypted communications session (e.g., used in a handshake process to establish the encrypted communications session) that a potential man-in-the-middle cannot re-use to establish another encrypted communications session without causing establishment of the other encrypted communications session to fail. In some embodiments, the information is a premaster secret used in a TLS handshake while other encrypted communications session-specific information is considered as being within the scope of the present disclosure.

Having determined the session-specific information is used by the client to derive information usable to distinguish the session from other sessions, such as by uniquely identifying the session, information usable to distinguish the session from other sessions may be determined. Such information may be referred to as a session-bound value. As an example, a cryptographic hash of the premaster secret may be used as a session-bound value. The session-bound value may be included in data that is digitally signed for submission of a request to the server. The digital signature may be generated, for example, based at least in part on both the request and the session-bound value. The request may then be submitted over the encrypted communications session (e.g., by encrypting the request for transmission). A cryptographic key registered with the server (or, more generally, with a system in which the server is a component) may be used to generate the digital signature. As a result, the digital signature thereby serves as a binding of the request to the encrypted communications session over which the request was submitted.

A server, having received such a digitally signed request, may verify that the request was received over the same encrypted communications session over which the request was submitted. The server may, for instance, calculate a session-bound value for an encrypted communications session that the server established purportedly with the client and use that reference session-bound value to determine whether it matches the session-bound value in the digitally signed request that it received. The server may be configured to operate with the reference session-bound value matching the received session-bound value as a prerequisite for certain operations to occur, such as fulfillment of the request. The server may also be configured to authenticate the digital signature with successful authentication as a prerequisite to performing certain operations, such as fulfilling the request. In this manner, if the server's session purportedly with the client is actually with a man-in-the-middle, the reference session-bound value will not match (assuming the man-in-the-middle does not have access to the client's cryptographic key that is registered with the system in which the server is a component) and the server will operate to enhance the security of data accessible to the server accordingly.

FIG. 1 shows an illustrated example of an environment 100 in accordance with an embodiment. In this particular example, the environment 100 includes a client 102, a server 104 and a man-in-the-middle 106. The client 102, server 104, and man-in-the-middle 106 may each be computer systems such as described in more detail below. It should be noted however that two or more of the client 102, server 104, and man-in-the-middle 106 may be implemented on the same physical computing device. For example, the man-in-the-middle may be configured as an unauthorized (or, in some embodiments, authorized) software application executing on either the client 102 or the server 104 and configured to intercept communications between the client 102 and the server 104. Further, while FIG. 1 shows a single man-in-the-middle between the client 102 and server 104, in some instances, there may be multiple men-in-the-middle. Still further, while FIG. 1 shows a man-in-the-middle 106, the techniques described herein are still applicable when there is no man-in-the-middle between the client 102 and the server 104.

In the particular example of FIG. 1, the client 102, server 104, and man-in-the-middle 106 communicate over a network such as the Internet or another such communications network such as described below. The man-in-the-middle 106 may be situated in the network over which the client 102 communicates with the server 104 so as to intercept communications between the client 102 and the server 104. In an embodiment, the client 102 and the server 104 perform various operations so as to create encrypted communications sessions over which communications between the client 102 and the server 104 may be transmitted. In some examples, the encrypted communications sessions are transport layer security (TLS) sessions. Generally, embodiments of the present disclosure may use various protocols, such as a SSL or TLS protocol and extensions thereto, such as defined in Request for Comments (RFC) 2246, RFC 2595, RFC 2712, RFC 2817, RFC 2818, RFC 3207, RFC 3268, RFC 3546, RFC 3749, RFC 3943, RFC 4132, RFC 4162, RFC 4217, RFC 4279, RFC 4347, RFC 4366, RFC 4492, RFC 4680, RFC 4681, RFC 4785, RFC 5054, RFC 5077, RFC 5081, RFC 5238, RFC 5246, RFC 5288, RFC 5289, RFC 5746, RFC 5764, RFC 5878, RFC 5932, RFC 6083, RFC 6066, RFC 6091, RFC 6176, RFC 6209, RFC 6347, RFC 6367, RFC 6460, RFC 6655, RFC 7027, and RFC 7366 which are incorporated herein by reference, to establish encrypted communications sessions.

Note that, while encrypted communications sessions are discussed throughout for the purpose of illustration, sessions that do not utilize encryption to provide message confidentiality are considered as being within the scope of the present disclosure. For example, modes of TLS that do not encrypt records, but that utilize cryptographic keys for message integrity can be used in place of encrypted communications sessions and the techniques discussed herein may be adapted accordingly. Such sessions, which despite not utilizing encryption for message confidentiality, nevertheless utilize cryptographic keys to cryptographically protect information (e.g., from tampering). Sessions that utilize cryptographic keys for message integrity and/or message confidentiality can be generally referred to as cryptographically protected communications sessions. In other words, cryptographically protected communications sessions include encrypted communications sessions and sessions that, while not providing message confidentiality, provide other ways of cryptographically protecting information (e.g., by providing message integrity). Other protocols implemented below the application layer of the Open Systems Interconnect (OSI) model may also be used and/or adapted to utilize techniques described herein. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

As part of establishment of an encrypted communications session, the server 104 may provide a digital certificate 108 to enable the client 102 to encrypt a session secret such as a pre master secret in embodiments that utilize TLS to a public key specified by the digital certificate 108. The digital certificate may be, for instance, an x.509 certificate or other type of digital certificate. Example digital certificates are discussed below in connection with FIG. 3.

In some instances, the man-in-the-middle 106 may intercept the server certificate 108 of the server 104 and replace the server certificate 108 with a fake server certificate 110. The fake server certificate 110 may have identical subject information as the server certificate 108, but include different cryptographic key information and, in some examples, is digitally signed by a different certificate authority. The fake server certificate 110 may correspond to a private cryptographic key accessible to the man-in-the-middle 106. The client 102 may not detect the existence of the fake server certificate 110 for various reasons, such as the client being misconfigured and, as a result, not being configured to verify the validity of the certificate, or such as the client being configured to trust a certificate authority that issued the fake server certificate 110.

In this manner, the man-in-the-middle 106 can establish two separate encrypted communications sessions, one with the client 102 established using the fake server certificate 110 and another with the server 104 using the genuine server certificate 108. The man-in-the-middle 106 may, for instance, perform a handshake process of a handshake protocol with each of the client 102 and the server 104.

As a result, the man-in-the-middle 106 may receive encrypted communications from the server 104 and decrypt such communications and perform various operations with the decrypted communications such as by processing the decrypted communications in accordance with programming logic and or performing other operations such as logging the decrypted communications. Similarly, the man-in-the-middle 106 may receive encrypted communications from the client 102 intended for the server 104 and may decrypt such communications and perform various operations with decrypted communications from the client 102. When applicable, the man-in-the-middle 106 may re-encrypt communications from the client 102 for communication over the encrypted communication session with the server 104 and similarly may re-encrypt communications from the server 104 for communication to the client 102 over the encrypted communications session that the man-in-the-middle 106 has established with the client 102. In this manner, without sufficient care, the client 102 and or server 104 may be unable to detect the presence of the man-in-the-middle 106. As a result, the client 102 and or server 104 may provide access to information that was otherwise intended to be securely transmitted between the client 102 and server 104.

Various embodiments of the present disclosure allow for enhanced detection of unauthorized man-in-the-middle computer systems such as the man-in-the-middle 106 illustrated in FIG. 1. In particular, techniques of the present disclosure include the client 102 echoing back to the server 104 information about an encrypted communications session that the client 102 has established purportedly with server 104. In some examples, the client 102 may transmit a fingerprint of the digital certificate (also referred to in brief as a "certificate") that was purportedly received by the client 102 from the server 104 to enable the server 104 to determine whether that certificate is the same certificate 108 that the server 104 transmitted to the client 102 or whether the certificate 108 intercepted by a man-in-the-middle and replaced with a fake server certificate. As another example, a client 102 may provide the fake server certificate 110 itself to the server 104 to enable the server 104 to determine whether the fake server certificate 110 received by the client 102 is the same server certificate 108 that the server 104 transmitted to the client 102. As yet another example, the client 102 may transmit information about its own certificate or otherwise associate it with the encrypted communications session that the client 102 established to the server 104 to enable the server 104 to determine whether such information matches the encrypted communications session that the server 104 established purportedly with the client 102.

Various techniques may be employed to enable the server 104 to determine with precision whether communications are being intercepted by a man-in-the-middle 106 and decrypted thereby. For example, the information provided from the client 102 to the server 104 may be digitally signed by the client 102 using a cryptographic key associated with the client 102 thereby preventing the man-in-the-middle 106 from altering the information provided from the client 102 to the server 104 without invalidating the digital signature of that information. The cryptographic key may correspond to another cryptographic key accessible to the server 104 (or another component of a distributed system of which the server 104 is a component) that was registered in association with an entity corresponding to the client 102 (e.g., a customer of a service provider that operates the server 104), where registration occurred outside of the encrypted communications session(s) established by each of the client 102 and server 104. As one example, the cryptographic key may be a cryptographic key shared as a secret between the client 102 and the server 104 or generally shared with a distributed computer system associated with the server 104 such as a distributed computer system that includes the server 104 but maintains the cryptographic key as a secret in another component of the distributed computer system. For example, the client 102 and server 104 may have negotiated the symmetric key using a process separate from a handshake that was performed by each. For example, the cryptographic key may have been exchanged at an earlier time using a different mechanism than the handshake that was performed by the client 102 and by the server 104 (possibly with each other or with the man-in-the-middle). Generally any way by which a symmetric cryptographic key can be exchanged between the client 102 and the server 104 without interference by the man-in-the-middle 106 is considered as being within the scope of the present disclosure.

Note that various embodiments of the present disclosure discuss digital signature verification being performed by a server. The server may be a component of a distributed system where another component of the distributed system (e.g., an authentication service) may perform digital signature verifications in response to requests to verify digital signatures received from the server. Such a component may have access to a cryptographic key usable to verify digital signatures from the client 102 and the server 104, in some examples (e.g., when the cryptographic key is a symmetric cryptographic key), the server 104 may not have access to the cryptographic key. Digital signature verification may occur using a cryptographic key derived from a secret shared between the client 102 (or a distributed system of which the client 102 is a part) and the server 104 (or a distributed system of which the server 104 is a part). Example techniques for such cryptographic key derivation and other techniques (e.g., digitally signing responses) are described in U.S. patent application Ser. No. 14/318,457, filed on Jun. 27, 2014, and titled "Dynamic Response Signing Capability In A Distributed System," which is incorporated herein by reference.

As yet another example, the client 102 may digitally sign the information provided to the server 104 using an asymmetric cryptographic key that is registered with the server 104 in association with the client 102. Such registration may have occurred, for example, in a separate process (from a process used to establish an encrypted communications session with the server 104 or man-in-the-middle 106) at an earlier time. In some examples, an entity that operates a distributing system that includes the server 104 also operates a certificate authority and a digital certificate of the client 102 corresponding to a private key held as a secret by the client 102 may be digitally signed by that certificate authority. Other variations are also considered as being within the scope of the present disclosure and generally the information digitally signed by the client 102 for transmission to the server 104 may be signed using a cryptographic key such that the digital signature is verifiable by the server 104 but for which the man-in-the-middle 106 is unable to alter the information and produce a fake digital signature.

The server 104, upon receiving information that is digitally signed by the client 102, may verify the information and determine whether the client 102 and the server 104 are communicating over the same encrypted communications session or whether a man-in-the-middle 106 is interfering with the communications (e.g., by having separate encrypted communications sessions with each of the client 102 and server 104). The server 104 may, for example, verify the information using information it has recorded for the encrypted communications session that the server 104 has established and also verify the digital signature using a cryptographic key associated with the client and usable to verify the digital signature. If either the information or the digital signature are invalid, the server 104 may perform various mitigating actions/operations such as by terminating the encrypted communications session that the server 104 has established, denying fulfillment of a request purportedly from the client 102, logging information about the man-in-the-middle 106 such as an internet protocol (IP) address, transmitting one or more notifications in the form of one or more electronic messages and/or other operations. Other example mitigating operations/actions include adding information identifying the man-in-the-middle (e.g., an IP address) to a blacklist and providing, to the client, an alternate IP address to a service that potentially can be reached without interference by the man-in-the-middle. In some examples, information from the server 104 can be used to avoid the man-in-the-middle. Information from the server 104 about the man-in-the-middle may be collected, for instance, and used to change border gateway protocol (BGP) routes that are advertised in routing advertisements so that communications are routed away from the man-in-the-middle. In other examples, information about the certificate authority that issued the fake server certificate may be logged and/or one or more actions in connection with the certificate authority may be taken, such as reconfiguring a computer system to distrust the certificate authority, causing a security update to be applied to the certificate authority, and/or other operations. In this manner, when communications between the server 104 and the client 102 are interfered with by the man-in-the-middle 106, such interference is detectable by the server 104 and the server 104 may proceed accordingly to maintain the security of data.

Figure 2:
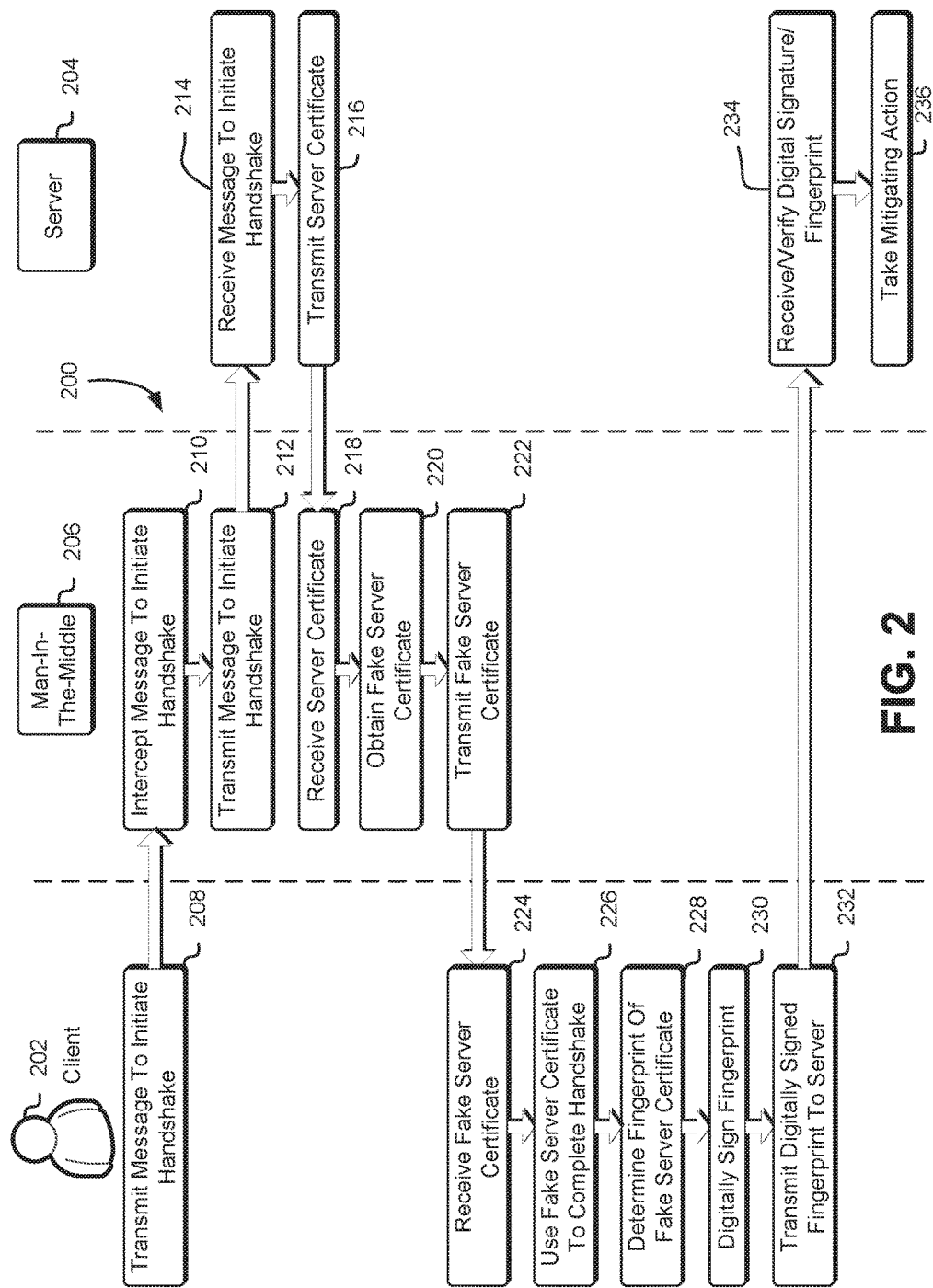
FIG. 2 shows a diagram illustrating communications among various entities to illustrate an application of various techniques of the present disclosure in accordance with an embodiment.

FIG. 2 shows a swim diagram 200 illustrating communications between various entities and techniques that may be used in accordance with various embodiments. In the diagram 200, communications occur among a client 202, a server 204, and a man-in-the-middle 206 such as described above. In an embodiment, the client 202 transmits 208 a message to initiate a handshake. The message may be transmitted, for example, to a network address associated with the server 204. The message may be a message configured in accordance with the protocol which the client 202 is utilizing. In the example of TLS, the message may be, for example, a ClientHello message. Instead of reaching the server 204, the message to initiate the handshake may be intercepted 210 by the man-in-the-middle 206. As noted above, the man-in-the-middle 206 may be in a position in a network so as to be able to intercept such messages and, in some examples, is a component of a device that implements the client 202 or the server 204.

Having intercepted 210 the message to initiate the handshake, the man-in-the-middle 206 may transmit 212 another message to initiate a handshake to the server 204 in place of the message that was transmitted 208 from the client 202. The server 204 may receive 214 the message to initiate a handshake and in response may transmit 216 a digital certificate (a server certificate) back to the man-in-the-middle 206. The man-in-the-middle 206 may then receive 218 the server certificate that the server 204 transmitted 216. To enable the client 202 to establish an encrypted communications session, the man-in-the-middle 206 may then obtain 220 a fake server certificate.

As illustrated in more detail below in FIG. 3, the fake server certificate 220 may be, in one or more aspects, identical to the server certificate that the server 204 transmitted 216. In some embodiments, the server certificate and the fake server certificate are identical except that the fake server certificate has a different public key which corresponds to a private cryptographic key held by the man-in-the-middle 206 whereas the genuine server certificate has a public cryptographic key corresponding to a private cryptographic key held by the server 204 as a secret. The fake server certificate that is obtained 220 by the man-in-the-middle 206 may also be digitally signed by a different certificate authority such as a certificate authority that does inadequate identity verification or that is operating in concert with the man-in-the-middle 206. Note, however, that the server certificate and the fake server certificate do not necessarily need to be issued by different certificate authorities if, for instance, unauthorized access to the certificate authority was gained to cause the certificate authority to issue the fake server certificate.

The man-in-the-middle 206 may obtain 220 the fake server certificate in various ways in accordance with various embodiments. For example, when working in concert with a certificate authority, the man-in-the-middle 206 may request and receive the fake server certificate from the certificate authority. The request to the certificate authority may include parameters that indicate parameters to be included in the certificate from the certificate authority such as a subject that matches the subject of the genuine server certificate that the server 204 transmitted 216. In other examples, the man-in-the-middle 206 may have previously obtained the fake server certificate for an entity corresponding to the server 204 and may obtain 220, the fake server certificate from memory in which the fake server certificate is stored.

Once the man-in-the-middle 206 has obtained 220 the fake server certificate, the man-in-the-middle 206 may transmit 222 the fake server certificate to the client 202. Note that the operations performed by the man-in-the-middle may differ from those illustrated in FIG. 2. For example, the man-in-the-middle 206 may obtain the fake server certificate and transmit 222 the fake server certificate in an order relative to operations performed in connection with the server 204 different than that which is illustrated in FIG. 2. Generally, operations described herein may be performed in various orders except when clearly contradicted by context, such as when one operation depends on the occurrence of a previous operation (e.g., one operation results in output that is used for input into another operation).

Turning back to the illustration of FIG. 2, the client 202 may receive the fake server certificate 224 and verify validity of the fake server certificate. The client 202 may, for example, verify a digital signature of the fake server certificate and verify that the digital signature corresponds to a certificate authority that the client 202 is configured to trust. The client 202 may also verify that the subject of the fake server certificate matches the subject with which the client 202 transmitted its message to initiate a handshake. For example, if the message was transmitted 202 to a server 204 operating a website, the client 202 may verify that a subject of the fake server certificate matches the domain name of the website with which the client 202 is transmitting the message for the purpose of establishing an encrypted communications session.

If the certificate authority that issued the fake server certificate is a certificate authority that the client 202 is configured to trust, the client 202 may not detect that the fake server certificate is not genuine because all other verifications of the fake server certificate may have passed. Accordingly, the client 202 may use 226 the fake server certificate to complete the handshake. In an illustrative example, the client 202 may determine a session secret and encrypt the session secret to a public key specified by the fake server certificate. The session secret may be a set of cryptographic keys and/or information usable to derive a set of cryptographic keys such that entities communicating over the corresponding encrypted communications session are able to encrypt messages that others in the session are able to decrypt.

Having completed 226 the handshake, the client 202 may determine 228 a fingerprint of the fake server certificate. In an embodiment, a fingerprint of a digital certificate is a sequence of bytes usable to authenticate the certificate and thereby authenticate a public key specified by the certificate. As an example, a fingerprint may be computed by calculating a secure hash algorithm (SHA), such as SHA-1, of a distinguished encoding rules (DER) encoding of the fake server certificate. Although other fingerprints are also considered as being in the scope of the present disclosure. For example, the certificate may be input into any one-way function. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that f(x)=y is below a specified threshold), second preimage resistance (given an input x1, the probability of randomly generating another input x2, different from x1, such that f(x1)=f(x2) is below a specified threshold) and/or collision resistance (the probability of two different inputs resulting in the same output is less than a specified threshold). One way functions suitable for use in generating an identifier for data include functions that satisfy properties of collision resistance (i.e., the probability of f(x1)=f(x2) for different x1 and x2 is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Further note that other information not necessarily classified as a fingerprint but that is sufficient for authenticating the certificate may be used instead of a fingerprint. In some examples, the certificate itself is used instead of a fingerprint. As illustrated in FIG. 2, in this particular example, the client 202 upon determining 228 the fingerprint of the fake server certificate digitally signs 230 that fingerprint. The client 202 may digitally sign 230 the fingerprint using a cryptographic key that the client 202 has registered with the server 204. A cryptographic key may be considered to be registered with the server 204 if the server 204 were another component in a distributed system in which the server 204 is a component configured to trust the cryptographic key. Note that the cryptographic key registered with the server 204 may be independent of an encrypted communications session that was established and that is being verified. For example, the cryptographic key may not have been used in either a record protocol or handshake protocol of the protocol used for the encrypted communications session. There may be no cryptographic connection between the encrypted communications session and the cryptographic key (e.g., no information used in the encrypted communications session was derived, at least in part, directly or indirectly, from the cryptographic key or a derivative of the cryptographic key). Generally, the cryptographic key used by the client 202 may be a cryptographic key that is inaccessible to potential men-in-the-middle such as the man-in-the-middle 206, which, at a time when the fingerprint is digitally signed 230 is undetected by the client 202 and the server 204. The cryptographic key may be, for example, a shared secret such as a symmetric cryptographic key shared between the client 202 and the server 204 or a distributed system in which the server 204 is a component or may be a private cryptographic key of a public/private key pair where the server 204 or a distributed system in which the server 204 is a component is configured to trust the public cryptographic key of the public private key pair and where such a system associates the public key with the client 202.

Having digitally signed 230 the fingerprint, the client 202 may transmit 232 the digitally signed fingerprint to the server 204. Note that because of the cryptographic key used by the client 202 to digitally sign 230 the fingerprint, the man-in-the-middle 206 is unable to modify the fingerprint without invalidating the digital signature, thus the man-in-the-middle 206 cannot modify the fingerprint to match the fingerprint of the genuine server certificate without invalidating the digital signature generated by the client 202. Further because the man-in-the-middle 206 lacks access to the cryptographic key used to digitally sign 230 the fingerprint, the man-in-the-middle 206 is unable to calculate a fingerprint of the genuine server certificate and digitally sign that fingerprint so as to be verifiable by the server 204.

Accordingly, assuming the man-in-the-middle 206 allows the digitally signed fingerprint to reach the server 204, the server 204 may receive and verify 234 the digital signature and the fingerprint. The server 204 may, for example, verify that the fingerprint received 234 matches the fingerprint of the genuine server certificate that the server 204 transmitted 216 and may also utilize a copy of a cryptographic key to verify the digital signature of that fingerprint. For example, if the digital signature was generated using a symmetric cryptographic key, the server 204 may utilize a copy of the symmetric cryptographic key to verify the digital signature. Similarly, if the client 202 utilized an asymmetric cryptographic key, that is a private key of a public/private key pair, the server 204 may use the public key of the public/private key pair to verify the digital signature. Other verifications, as applicable, may also be performed such as by verifying a signature of the digital certificate that specifies the public cryptographic key to use to verify the digital signature.

In the example illustrated in FIG. 2, because of the interference by the man-in-the-middle 206, either the fingerprint of the fake server certificate will not match the fingerprint of the server certificate that the server 204 transmitted 216 or the digital signature will be invalid (or both). As a result, the server 204 will detect the mismatch and will take 236 mitigating action. The mitigating action may be, for example, terminating the encrypted communication session that the server 204 established with the man-in-the-middle 206 and/or performing other operations such as denying any requests that were also received from the client 202. Other mitigating actions such as those described above and also below are also considered to be within the scope of the present disclosure as being mitigating actions.

Figure 3:
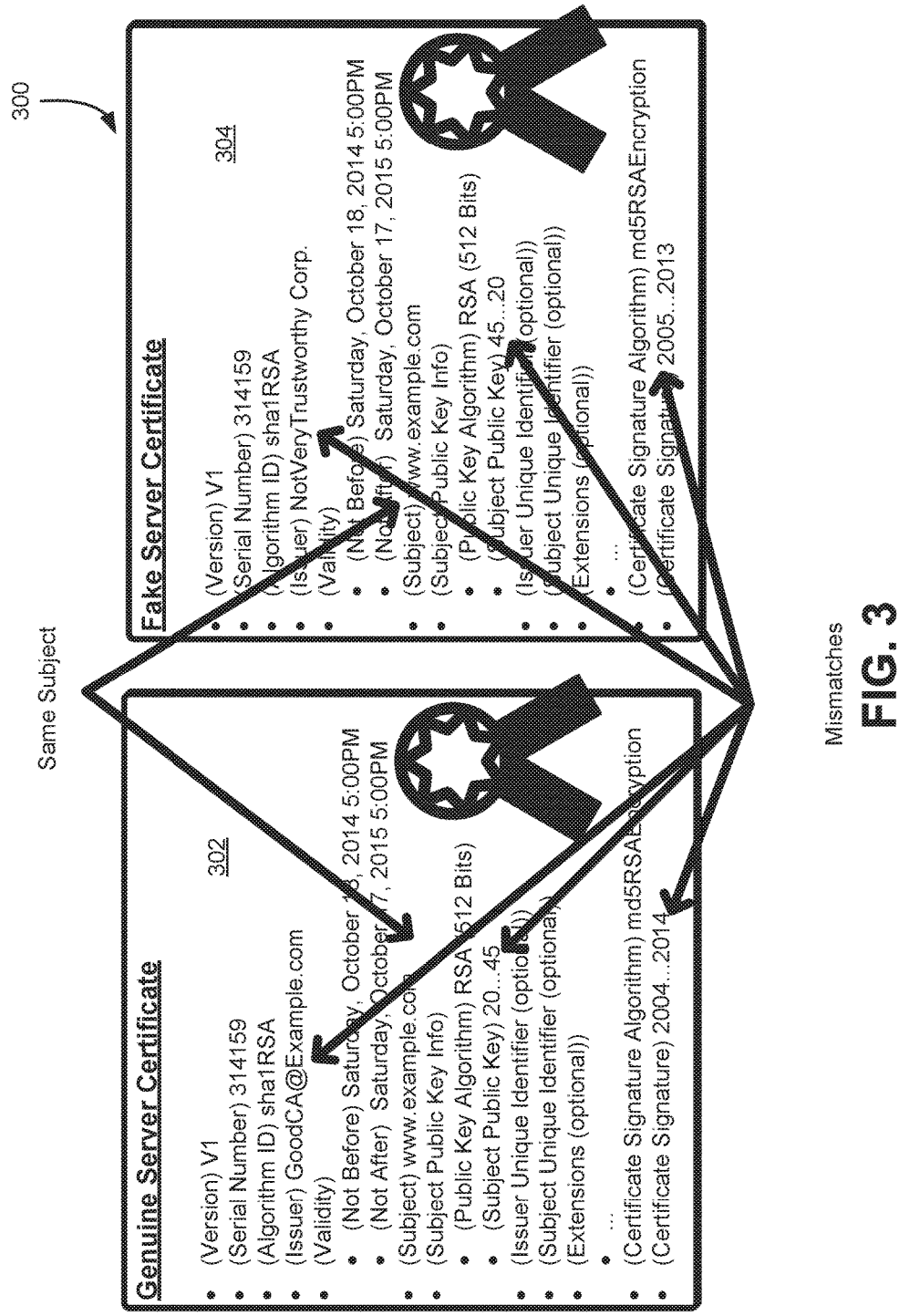
FIG. 3 shows a diagram comparing example digital certificates in accordance with an embodiment.

FIG. 3 shows a diagram 300 illustrating example differences between a genuine server certificate 302 and a fake server certificate 304 such as those discussed above in connection with FIG. 2. In the example of FIG. 3, the certificates 302 and 304 are x.509 certificates, although other digital certificate encodings are also considered as being within the scope of the present disclosure. In this particular example, each certificate includes various fields such as a version, a serial number, an algorithm identifier, an issuer, fields for validity periods, a subject field, fields about the public graphic key, issuer unique identifier fields, subject unique identifier fields, extension fields, certificate signature algorithm fields, a certificate signature field. X.509 certificates are described in RFC 4158, RFC 5280, and RFC 1422, which are incorporated by reference.

As illustrated in FIG. 3, many of the fields between the genuine certificate 302 and the fake server certificate 304 are the same. Notably, the subject fields of both the genuine server certificate 302 and the fake server certificate 304 are identical (or at least have at least one identical component (e.g., domain name)), thereby requiring a computer system having received such certificate to require the use of other information to determine that the fake server certificate 304 is not genuine. Note, however, that some fields may be different to enable a man-in-the-middle to establish concurrent encrypted communications sessions with a client and a server attempting to communicate with one another. In particular, the fake server certificate 304 may be issued by a different certificate authority than the genuine server certificate 302. As such, the issuer fields may differ among the genuine server certificate 302 and the fake server certificate 304. Also because the fake server certificate 304 will generally correspond to a different private cryptographic key, the public cryptographic key of the fake server certificate 304 may differ from that of the genuine server certificate 302. Other fields may also differ, although such fields are not illustrated as different in FIG. 3. For example, a man-in-the-middle may use different cryptographic algorithms between the client and server.

Figure 4:
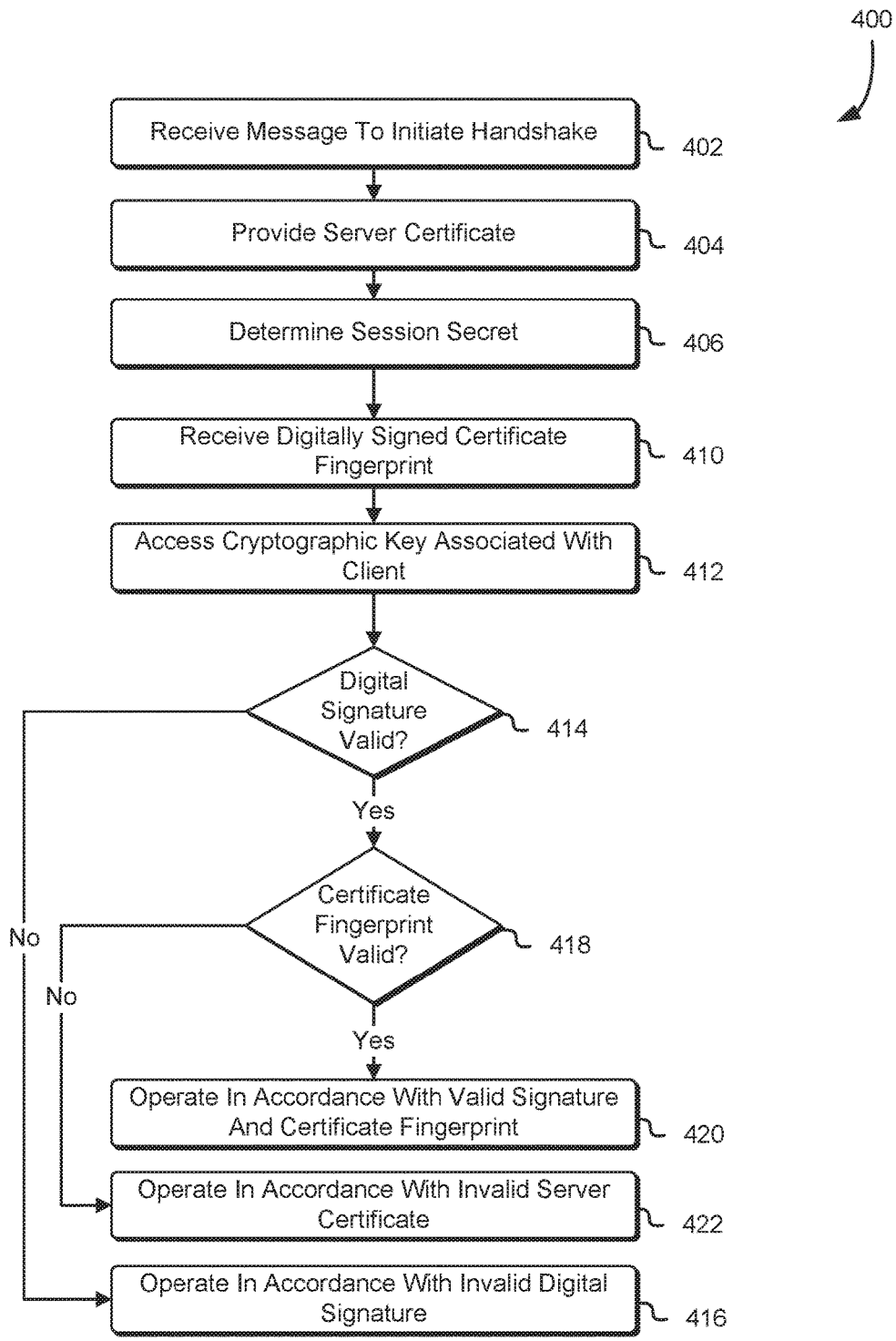
FIG. 4 shows an illustrative example of a process for detecting an unauthorized man-in-the-middle, which may be performed server-side, in accordance with an embodiment.

FIG. 4 shows an illustrative example of a process for detecting an unauthorized man-in-the-middle in accordance with an embodiment. The process 400 may be performed by any suitable system such as by a server computer system such as described above. However, it should be noted that any system configured to perform operations discussed in connection with FIG. 4 may perform the process 400 and variations of the process 400. In an embodiment, the process 400 includes receiving 402 a message to initiate a handshake. The message may be any message configured to cause a system performing a process 400 to perform a handshake process of a handshake protocol of an encrypted communications session protocol such as TLS. For example, in some embodiments, the message is a ClientHello message. In response to receipt 402 of the message to initiate the handshake, the process 400 may include providing 404 a server certificate. The server certificate may be provided 404 such as by obtaining the server certificate from storage and transmitting the server certificate to a network destination corresponding to the source of the message to initiate the handshake.

At some point after having provided 404 the server certificate, a system performing the process 400 may determine 406 a session secret. The type of information comprising the session secret may vary in accordance with various embodiments. For example, with respect to TLS the session secret may be a pre-master secret or a master secret. Generally, the session secret may be a set of cryptographic keys and/or information usable to derive a set of cryptographic keys for use in an encrypted communications session. In some embodiments, the session secret is received in encrypted form and decrypted (e.g., using a private key of a public key corresponding to a digital certificate that was provided for a handshake). In other embodiments, appropriate mathematical calculations may be performed, such as when using a Diffie-Hellman key exchange algorithm. Generally, the manner in which the session secret is determined 406 may vary in accordance with various implementations for establishing encrypted communications sessions. Other operations not illustrated herein may also be performed, such as using the session secret to drive a set of cryptographic keys.

After the encrypted communications session has been established, which may include additional operations not illustrated herein such as verification of a client certificate and/or transmission and/or receipt of a message to enter a record protocol of an encrypted communications protocol that includes a handshake protocol and a record protocol such as TLS, the process 400 may include receiving 410 a digitally signed certificate fingerprint. The digitally signed certificate fingerprint may be received 410 over the encrypted communications session that was established at least in part by performing operations discussed above, that is by completing a handshake to negotiate a set of cryptographic keys for the encrypted communications session. In other words, the digitally signed certificate fingerprint may be received in an encrypted manner and, upon receipt 410 of the digitally signed certificate fingerprint, the digitally signed certificate fingerprint may be decrypted using a cryptographic key negotiated as part of the handshake. In some embodiments, the fingerprint is a parameter of a request and the digital signature is generated over the request, thereby also being based at least in part on the fingerprint.

Once the digitally signed certificate fingerprint has been received 410, a system performing the process 400 may verify that the received 410 digitally signed certificate fingerprint matches the server certificate that was provided 404. To do this, as illustrated in FIG. 4, the process 400 may include accessing 412 a cryptographic key associated with a client from which the message to initiate the handshake 402 was purportedly received. That is, the message to initiate the handshake that was received 402 may include information associated with the client such as an identifier of the client, but as discussed above, may have been received from the client or from a man-in-the-middle. As noted above, the cryptographic key that is accessed 412 may be a symmetric cryptographic key shared as a secret with the client or a public key corresponding to a private cryptographic key held as a secret by the client where the public key was previously registered with a system performing the process 400.

Having accessed 412 the cryptographic key associated with the client system performing the process 400 may determine 414 whether the digitally signature of the digitally signed certificate fingerprint is valid. For example, the system may utilize the cryptographic key associated with the client in a digital signature verification algorithm. In some embodiments, the system generates a reference signature based at least in part on the fingerprint and the cryptographic key and determines whether the reference signature matches (e.g., is equal to) the digital signature that was received. If determined 414 that the digital signature is not valid, the process 400 may include operating 416 in accordance with an invalid digital signature. Such operation may include, for instance, taking one or more mitigating actions such as described above.

If, however, it is determined 414 that the digital signature is valid, the process 400 may include determining 418 whether the certificate fingerprint is valid. Determining whether the certificate fingerprint is valid may be performed, for instance, by determining whether the certificate fingerprint that was received 410 equals or otherwise matches a fingerprint of the server certificate that was provided 404. If the system performing the process 400 determines 418 that the certificate fingerprint is valid, the system may operate 420 in accordance with a valid signature and certificate fingerprint. Such operation may include, for example, keeping the established encrypted communications session open and processing messages that are received over the encrypted communications session. The system may, for instance, fulfill requests received over the encrypted communications session such as application programming interface requests to perform operations which may include the access of data accessible to the system performing the process 400.

If, however, a system performing the process 400 determines 418 that the certificate fingerprint is invalid, such a determination 418 may indicate the existence of a man-in-the-middle, as may a determination that the digital signature is invalid. As a result, the process 400 may include operating 422 in accordance with an invalid server certificate when determined 418 that the certificate fingerprint is invalid. Such operation may be the same operation as when determined 414 that the digital signature is invalid or may vary from such operation. For instance, the existence of a valid digital signature but an invalid certificate fingerprint may more strongly indicate the existence of a man-in-the-middle than simply an invalid digital signature which may the result of an improperly configured client computer system. As a result, operation in accordance with an invalid server certificate may include additional operations such as transmission of notifications and/or other mitigating action that may not be taken when the digital signature is simply invalid.

As with all processes discussed herein, variations are considered as being within the scope of the present disclosure. For example, embodiments described herein for the purpose of illustration utilize fingerprints of certificates for the purpose of authenticating certificates, but other information may be used. For example, the certificates themselves may be used instead of fingerprints, although fingerprints provide efficiency as fingerprints generally require less information to transmit over a network. Generally, any information derived from a certificate and/or a public key and a certificate may be used to authentic the certificate, and while various embodiments utilize fingerprints, other information may be substituted. Further, FIG. 4 illustrates a process whereby a digital signature is verified before a fingerprint of a certificate is verified. The verifications may be performed in a different order or in parallel.

In some embodiments, performance of the process 400 or variations thereof do not result in confidentiality of requests that are transmitted before a man-in-the-middle is detected. For example, as noted, the digitally signed certificate fingerprint may be received by the system performing the process 400 as a parameter in a request that is transmitted to a server performing the process 400. For instance, the certificate fingerprint may be a parameter in the request and the digital signature may cover the request which includes the certificate fingerprint. As a result, a man-in-the-middle may be able to determine data in the request by having established an ability to decrypt communications transmitted by an entity that submitted the request.

Figure 5:
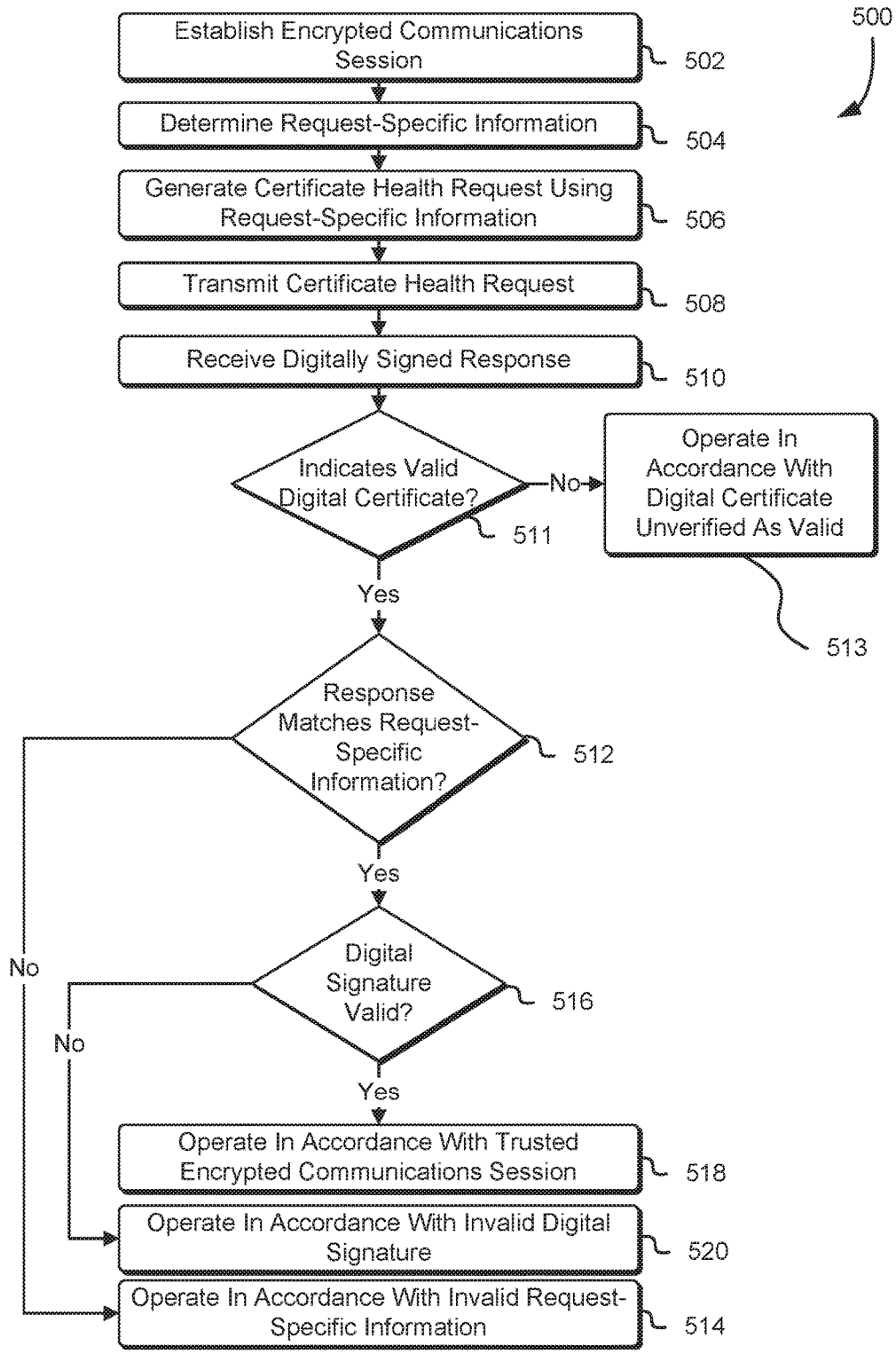
FIG. 5 shows an illustrative example of a process for detecting an unauthorized man-in-the-middle, which may be performed client-side, in accordance with an embodiment.

Variations of the present disclosure allow for confidentiality of requests by enabling client computer systems to perform certificate health checks (checks on the validity of a digital certificate that was presented) prior to transmitting confidential requests. FIG. 5 accordingly shows an illustrative example of a process 500 for performing a certificate health check in accordance with an embodiment. The process 500 may be performed by any suitable system, such as by a client computer system discussed above, although any computer system configured with executable instructions for performing the process 500 may perform the process.

In an embodiment, the process 500 may include establishing 502 an encrypted communications session. An encrypted communications session may be established 502 in various ways in accordance with various embodiments, such as by performing a handshake process of a handshake protocol. As an example, the process 500 may include establishing a TLS session. Having established the encrypted communications session, in an embodiment the process 500 includes determining request-specific information. The request-specific information may be, for instance, a nonce, a request identifier, a time stamp, or other information usable to prevent successful replay of a response to a request that will be submitted using the determined 504 request-specific information.

In an embodiment, the determined 504 request-specific information can be used to generate 506 a certificate health request. In an embodiment, a certificate health request is a request configured to elicit a response that enables the response to be analyzed to determine whether a certificate received as a result of establishment 502 of the encrypted communications session is authentic. In some embodiments, a certificate health request is a specific type of request, while in other embodiments different types of requests may operate as certificate health requests although such requests may have additional purposes. Generally, a certificate health request may be any request configured to elicit a response that is usable to verify certificate authenticity and where the request itself does not require confidentiality. The generated 506 certificate health request may comprise, as a parameter of the request, a fingerprint of the digital certificate to be checked by fulfillment of the request, the certificate itself, or other information specific to the certificate.

Once a system performing the process 500 generates the certificate health request using the request-specific information, the system may transmit 508 the certificate health request to the entity with which the system established 502 the encrypted communications session, which in some embodiments may be a genuine server or in other embodiments may be a man-in-the-middle. The request may be transmitted 508 over the encrypted communications session that was established using the certificate being checked. As noted above, a certificate health request may be configured to elicit a response and the process 500 accordingly may include receiving 510 a digitally signed response to the transmitted 508 certificate health request. Upon receipt 510 of the digitally signed response to the certificate health request, the process 500 may include determining 411 whether the response indicates that the digital certificate being checked is valid. The response may, for instance, include a value that specifies whether the digital certificate has been successfully verified as valid. If determined 511 that the response indicates that the digital certificate has not successfully been verified as valid (or in other instances, such as a failure to receive a response), the process 500 may include operating 513 in accordance with the digital signature not having been successfully been verified as valid (e.g., on an assumption that the digital signature is invalid). Such operation may include, for instance, terminating the encrypted communications session and/or performing other mitigating operations, such as described elsewhere herein.

If determined 511 that the response indicates that the digital certificate has successfully been verified as valid, the process 500 may include determining 512 whether the response matches the request-specific information. The response may, for example, include the request-specific information that was included as a parameter in the certificate health request or other information usable to determine whether the response matches the request, such as a value derived from the request-specific information (e.g., by application of a function, such as a hash function, to the information).

A determination 512 whether the response matches the request-specific information may include a determination whether the request-specific information provided in the response is equal to or otherwise matches the request-specific information provided in the certificate health request. If it is determined 512 that the response does not match the request-specific information, such a determination 512 may indicate the existence of a man-in-the-middle or other operational problem. Accordingly, the process 512, upon determining the response does not match the request-specific information, may include operating 514 in accordance with invalid request-specific information. Such operation may include taking one or more mitigating actions such as described above.

If, however, the system performing the process 500 determines 512 that the response matches the request-specific information, the process 500 may include further determining 516 whether the digital signature of the digitally signed response is valid. Such a determination 516 may be made, for example, by accessing a cryptographic key associated with a server with which the encrypted communications session was purportedly established. The cryptographic key may be, for instance, a secret shared with the server or derived therefrom, such as described above. As another example, the cryptographic key may be a public cryptographic key of a public/private key pair where the public key of the public/private key pair was previously verified outside of establishment 502 of the encrypted communications session.

Having accessed the cryptographic key, the system may perform a digital signature verification algorithm to make the determination 516 whether the digital signature is valid. If determined 516 that the digital signature is valid, the process 500 may include operating 518 in accordance with a trusted encrypted communications session. The system performing the process 500 may, for instance, transmit requests over the encrypted communications session and may trust responses received over the session. If, however, it is determined 516 the digital signature is not valid, the process 500 may include operating 520 in accordance with an invalid digital signature which may include taking one or more mitigating actions such as described above. Note that operation in accordance with an invalid digital signature and operation in accordance with invalid request-specific information may vary or may be the same. As with all processes described herein, variations such as those described above are considered as being within the scope of the present disclosure, such as variations in the order of determinations that are made in the performance of the process 500.

Figure 6:
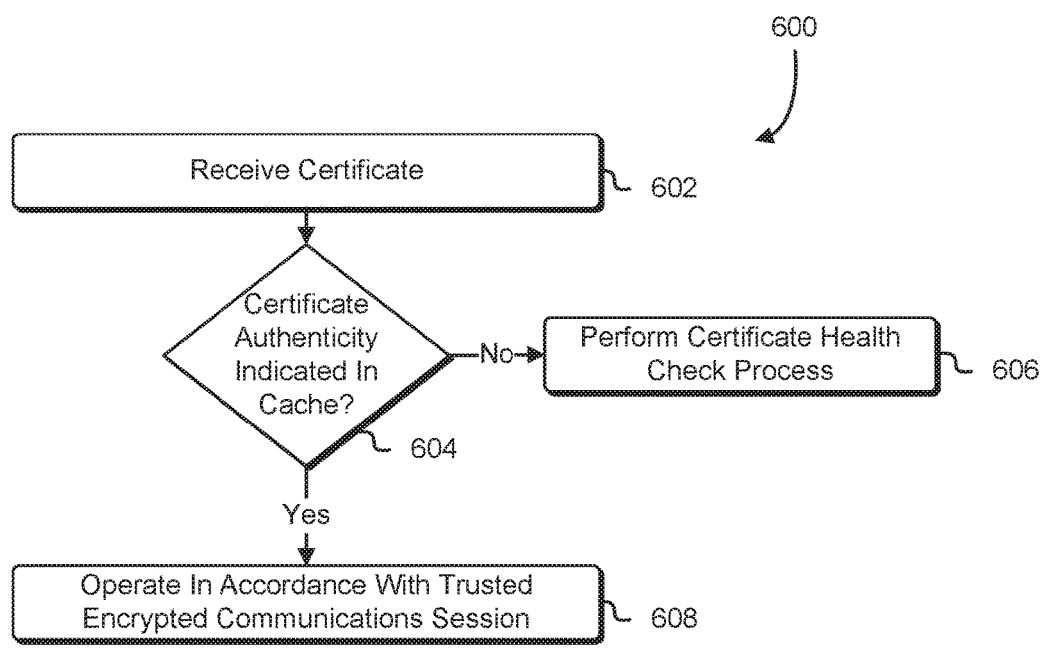
FIG. 6 shows an illustrative example of a process for increasing efficiency through caching information about digital certificates in accordance with an embodiment.

Various optimizations may be made to increase the efficiency of operations described herein. FIG. 6 accordingly shows an illustrative example of such an optimization which may be performed by a client computer system or generally any computer system that performed the process 500 discussed above. For instance, a system performing the process 500 discussed above in connection with FIG. 5 may, upon having determined that a certificate health request response was both valid (e.g., bound to the request and indicating that the server verified the fingerprint/certificate to be valid) and had a valid digital signature, may cache the response or information derived and/or otherwise associated with the response. In this manner, the information may be used later such as when future encrypted communications sessions with the same server are established.

In the example of FIG. 6, in an embodiment, a process 600 includes receiving 602 a certificate. The certificate may be received 602 such as during the performance of a handshake process of a handshake protocol to establish an encrypted communications session. Having received 602 the certificate, the process 600 may include determining 604 whether the authenticity of the certificate is indicated in a cache. The cache may indicate that the certificate's authenticity has been verified in various ways in accordance with various embodiments. For example, the certificate itself may be stored in the cache and a determination may be made whether the certificate is stored in the cache. As another example, a fingerprint of the certificate that was received may be searched for in the cache and existence of the fingerprint in the cache may indicate that the authenticity of the certificate has been previously verified. As yet another example, responses to certificate health-check requests may be stored in the cache and a fingerprint of the certificate may be used to determine whether such a response has been stored in the cache and if so whether the response indicates that the certificate is authentic. Other variations are also considered as being within the scope of the present disclosure.

If it is determined 604 that authenticity of the certificate is not indicated in the cache, the process 600 may include performing 606 a certificate health-check process, which may be performed, for example, by performing operations described above in connection with FIG. 5 beginning with determination 504 of request-specific information. If the certificate health-check process is successful, the cache may be updated accordingly so that the same certificate can be used again at a later time without performing a certificate health-check process. If it is determined, however, that the certificate authenticity is indicated in the cache, the process 600 may include operating 608 in accordance with a trusted encrypted communications session, such as by transmitting confidential requests of the encrypted communications session. In this manner, once a certificate health-check process has been successfully performed, the same certificate may be used for multiple encrypted communications sessions without having to perform the additional operations for redundant certificate health checks.

Numerous variations of the process 600 are considered as being within the scope of the present disclosure. For example, in an embodiment, a device performing the process 600, such as a client computer system, may have a cache of certificates in its local data storage. In other embodiments, a cache may be shared among multiple computer systems and as a result may be a component in a distributed system (i.e., a shared cache). Verification of whether a certificate of authenticity is indicated in the cache may include transmission of a query to the shared cache over a network. Multiple client computer systems may be able to verify certificate authenticity by checking whether certificate authenticity verification is indicated in the shared cache.

Other variations considered as being within the scope of the present disclosure include variations where requests are bound to encrypted communications sessions for the purpose of enabling computer systems to determine whether requests received over such encrypted communications sessions were transmitted over the same encrypted communications sessions over which the requests are received. In other words, techniques of the present disclosure enable a server computer system to determine whether a request that is received by the server computer system was transmitted over the same encrypted communications session over which the request was received. In this manner, a server computer system can determine whether a man-in-the-middle computer system is interfering with communications and may operate accordingly.

Figure 7:
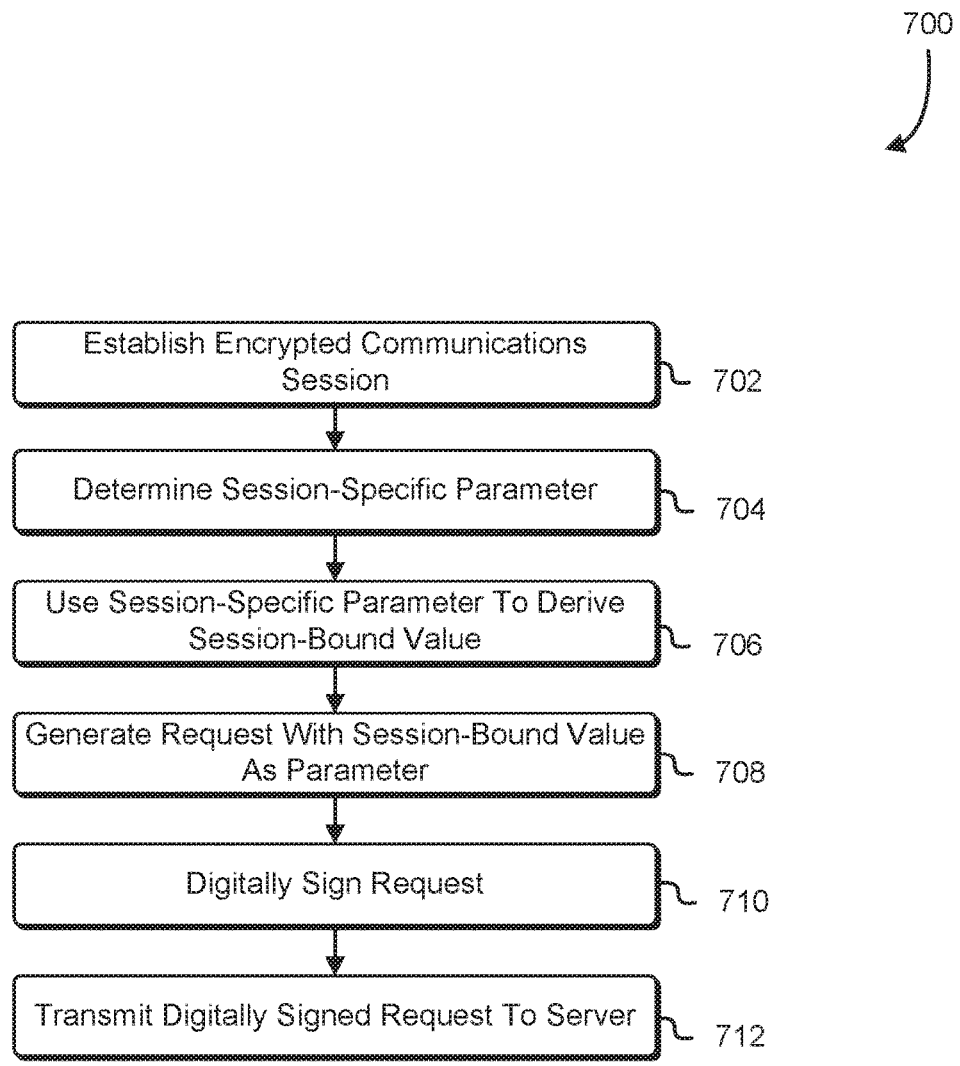
FIG. 7 shows an illustrative example of a process for submitting a session-bound request in accordance with an embodiment.

FIG. 7 shows an illustrative example of a process 700 in which a client computer system may bind a request to an encrypted communications session with which the client computer system communicates. In an embodiment, the process 700 includes establishing 702 an encrypted communications sessions such as described above. For instance, the encrypted communications session may be a TLS session and the TLS session may be established by performing a TLS handshake. Having established 702 the encrypted communications session, the process 700 may include determining 704 a session-specific parameter. In an embodiment, the session-specific parameter is a premaster secret, master secret, or information derived from the premaster secret or master secret. Use of a premaster secret and derivations thereof may be limited, in various embodiments, to certain premaster secrets, such as premaster secrets computing using a Diffie-Hellman key exchange, such as in a TLS ephemeral mode. As another example, the session-specific parameter may a server certificate or information derived therefrom (e.g., a public cryptographic key, a fingerprint, or other information), which may be the server or which may be a man-in-the-middle. In some examples, relative to a client (or server, in some embodiments) the session-specific parameter may be any information that is used to establish an encrypted communications session that, if used in the same way by a man-in-the-middle to attempt to establish another encrypted communications session with another entity, would cause the attempt to fail. As another example, a client certificate and/or information otherwise based at least thereon (e.g., a fingerprint of the certificate and/or a public key of the certificate) can be used as session-specific information, such as for client-authenticated TLS handshakes. As yet another example, the session-specific parameter can comprise a hash of all previous messages of the session (or a handshake completed to establish the session), a subset thereof, a message in accordance with an encrypted communications protocol (e.g., TLS) that contains such information and/or a hash of such a message. Such a message may be, for instance, a TLS Certificate Verify Message, a TLS Finished Message, or another message, which may be an extension to an existing version of a TLS protocol. As other examples, relative to an entity (e.g., client), the session-specific information may be any information resulting from a handshake process that a man-in-the-middle could not (e.g., is extremely unlikely to be able to) cause to result from establishment of another encrypted communications session with another entity different from the entity. In other words, the session-specific information may be information that a man-in-the-middle cannot cause to result from another session with another entity. Session-specific parameters can also be derived from such information but not equal to the information itself.

Having determined 704 the session-specific parameter, the process 700 may include using 706, the session-specific parameter, to derive a session-bound value. The session-bound value may be, for example, output of a hash function applied to the session-specific parameter. Or in some embodiments, when the session-specific parameter is not a secret that should be prevented from being provided to a man-in-the-middle, the session-bound value may be equal to the determined 704 session-specific parameter. In other words, in some embodiments, a derivation of the session-bound value need not occur once the session-specific parameter has been determined. Once a session-bound value has been derived 706, the process 700 may include generating 708 a request with the session-bound value as a parameter. The request may be, for instance, an application programming interface request, which may be a web service request that is configured to cause a server to process the request and provide a response. Having generated 708 the request, the process 700 may include digitally signing 710 the request using a cryptographic key that is registered with a server with which the encrypted communications session 702 is purportedly established. Note that while FIG. 7 shows the session-bound value as a parameter of the request, generally, the session-bound value may be included outside of the request as long as it is part of the information that is digitally signed 710.

Once a request has been digitally signed 710, the process 700 may include transmitting 712 the digitally signed request to the server. The digitally signed request may be transmitted 712 over the established encrypted communications session. As discussed in more detail below, the server may use the session-bound value to determine whether it receives the request over the same encrypted communications session over which the system performing the process 700 transmitted 712 the digitally signed request.

Figure 8:
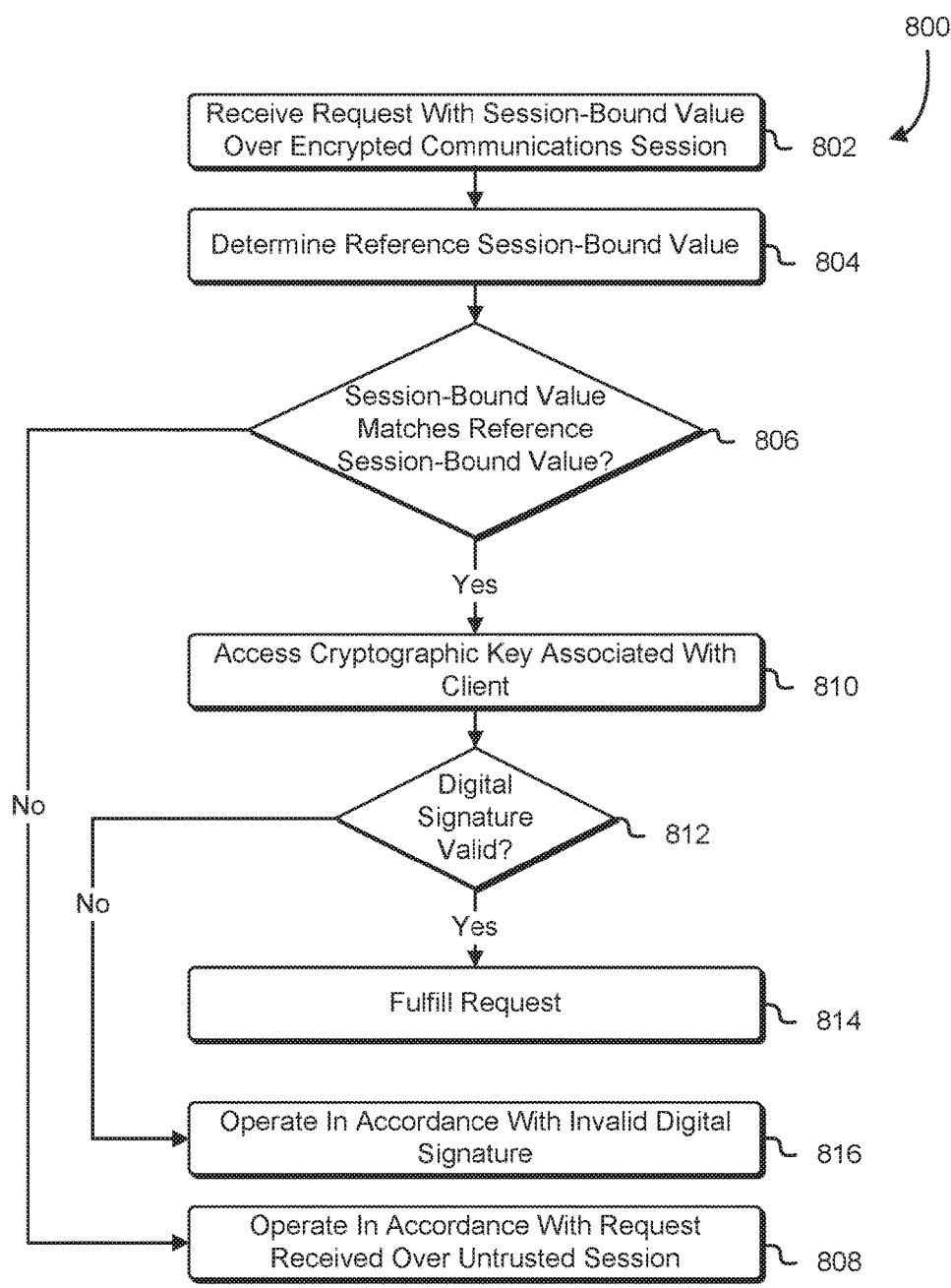
FIG. 8 shows an illustrative example of a process for processing a session-bound request in accordance with an embodiment.

FIG. 8 shows an illustrative example of a process for processing a request in accordance with an embodiment. The process 800 may be performed by any suitable system such as by a server computer system described above. Performance of the process 800 may enable such a system, for example, to determine whether a request was submitted over the same encrypted communications session over which the request was received by the system performing the process 800. Turning to the specific embodiment illustrated in FIG. 8, the process 800 may include receiving 802 a request with a session-bound value over an encrypted communications session. As noted above, the session-bound value may be a parameter of the request that is received or may be included outside of the request but with the request. In various embodiments, the request that is received is digitally signed and the digital signature covers the session-bound value either because the session-bound value is a parameter of the request or the digital signature was computed over data that includes the request and the session-bound value.

To process the request, in an embodiment, the process 800 includes determining 804 a reference session-bound value. A reference session-bound value may be a session-bound value such as described above however computed for the encrypted communications session that the system performing the process 800 established, which may be the same as or different from the encrypted communications session established by the system that submitted the request that was received 802. For example, the system performing the process 800 in some embodiments derives the reference session-bound value from a premaster secret that was involved in establishment of a TLS session over which the request was received 802. Having obtained the reference session-bound value, the system performing the process 800 may determine 806 whether the session-bound value that was received 802 with the request matches the reference session-bound value that the system determined 804. The session-bound value and the reference session-bound value in some embodiments match as a result of being equal.

If the system determines 806 that the session-bound value does not match the reference session-bound value, such a determination may indicate the presence of a man-in-the-middle as a result of the request being received over an encrypted communications session that is different from the encrypted communications session over which the request was transmitted. Having determined 806 that the session-bound value does not match the reference session-bound value, the system performing the process 800 may operate 808 in accordance with the request having been received over an untrusted session. Such operation may include taking one or more mitigating actions such as described above. In this particular example, such operation may include denial of the request that was received 802. Other operations may also be performed.

If, however, the system performing the process 800 determines 806 that the session bound value matches the reference session-bound value, the system may access 810 a cryptographic key associated with the client that submitted the request that was received 802 that is a principal specified by or otherwise associated with the request. Such a cryptographic key may have been pre-registered to the client or an entity associated therewith (e.g., customer of a service provider or account of a customer of a service provider). The system may then determine 812 whether the digital signature of the request that was received 802 is valid using a digital signature verification algorithm.

If the system determines 812 that the digital signature is valid, the system may fulfill 814 the request that was received 802. Fulfillment 814 of the request may be performing one or more operations corresponding to the request and/or causing one or more other systems such as a back-end subsystem to perform one or more operations for fulfillment of the request. In some embodiments, fulfillment of the request includes determining a session-bound value for an encrypted communications session that the server established and digitally signs that value (e.g., by putting the session-bound value in a response to the request and digitally signing the response) using a key independent of the encrypted communications session that is associated with the client. In this manner, the client can also perform the same verifications that the server performs in the process 800 and may operate accordingly (e.g., by terminating a session and/or not trusting a response if the session-bound value does not match the client's session-bound value and/or if the digital signature is invalid). Returning to the embodiment illustrated in FIG. 8, if, however, the system determines 812 that the digital signature is not valid, the system may operate 816 in accordance with an invalid digital signature. Such operation 816 may include performing one or more mitigating actions such as described above, which may be the same actions that are taken when determined 806 that the session-bound value does not match the reference session-bound value.

Note that, as with other figures described herein, while FIGS. 7 and 8 illustrate processes described in connection with entities labeled as clients and servers, the techniques described herein can be adapted such that roles are reversed. For instance, while FIG. 7 illustrates a process whereby a client provides to a server information specific to a session that the client established, a server may, in addition or as an alternative, send information specific to a session that the server established, thereby enabling the client to detect a man-in-the-middle, if present. The client, in this example, may perform operations illustrated in FIG. 8. Further, while FIG. 7 shows information specific to a session being encoded in a request, the information may be digitally signed and transmitted in a communication not classified as a request. A server, in such embodiments, could verify the information and the signature, such as described above, but does not necessarily need to generate a response to the request.

As noted in various places above, variations of the techniques described explicitly herein are considered as being within the scope of the present disclosure. For example, operations of various processes described herein may be performed by different components in a distributed system. For example, digital signature verification may be performed by a different component of a distributed system than a component that receives a request. In addition, additional operations may also be performed even though not explicitly illustrated in the figures or otherwise discussed in connection with the processes. For example, many processes described above include digital signature verification as a prerequisite for fulfillment of a request or performance of other operations. Other operations that may be performed may include authorization checks to determine whether fulfillment of the request is authorized. For example, systems configured to process requests may be further configured to store policies in association with principles and or resources. When a request is received, an additional prerequisite may include a determination that fulfillment of the request satisfies any applicable set of policies. Accordingly, when a request is received, additional operations that may be performed include accessing applicable policies and applying policies to the requests that are received to determine whether such requests are authorized.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Figure 9:
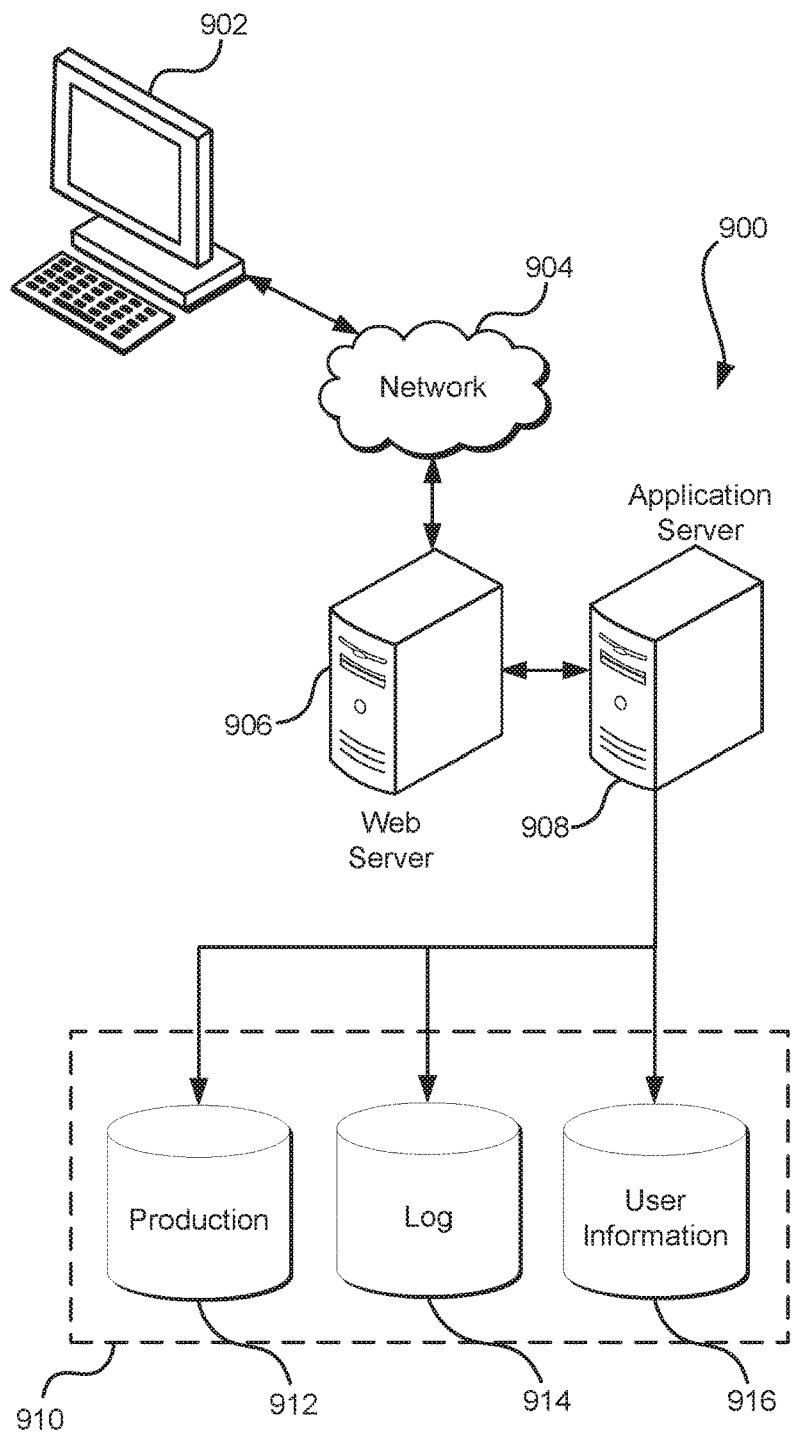
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase °, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, over an established cryptographically protected communications session, a message and a digital signature;
verifying, based at least in part on the message, a cryptographic key obtained after establishment of the established cryptographically protected communications session, and the digital signature, whether the message was transmitted over the established cryptographically protected communications session; and
indicating whether the message was transmitted over the established cryptographically protected communications session.

2. The computer-implemented method of claim 1, wherein the cryptographic key corresponds to a secret negotiated as part of a handshake process to establish the cryptographically protected communications session.

3. The computer-implemented method of claim 1, further comprising performing one or more mitigating actions as a result of failing to verify that the message was transmitted over the established cryptographically protected communications session.

4. The computer-implemented method of claim 1, wherein the cryptographic key is obtained outside of a process for establishing the established cryptographically protected communications session.

5. A system, comprising:
one or more non-transitory machine-readable mediums having stored thereon a set of instructions, which as a result of being executed by one or more processors, cause the system to at least:
receive, over an established cryptographically protected communications session, a message and a digital signature;
verify, based at least in part on the message, a cryptographic key obtained after establishment of the established cryptographically protected communications session, and the digital signature, whether the message was transmitted over the established cryptographically protected communications session; and
indicate whether the message was transmitted over the established cryptographically protected communications session.

6. The system of claim 5, wherein verifying the message includes determining whether a digital signature generated using the cryptographic key matches the digital signature.

7. The system of claim 5, wherein the set of instructions further cause the system to determine information specific to the cryptographically protected communications session, the verification being based at least in part on the information specific to the cryptographically protected communications session.

8. The system of claim 7, wherein generating the information specific to the cryptographically protected communications session includes applying the cryptographic key to a parameter used to establish the cryptographically protected communications session.

9. The system of claim 5, the set of instructions further cause the system to generate a value specific to the cryptographically protected communications session, wherein the verification includes comparing a second value, received in association with the message, with the value specific to the cryptographically protected communications session.

10. The system of claim 9, wherein the value specific to the cryptographically protected communications session is generated based at least in part on a secret used to establish the cryptographically protected communications session.

11. The system of claim 5, the set of instructions further cause the system to:
based at least in part on verifying that the message was transmitted over the cryptographically protected communications session, generate a response to the message, the response including a digital signature generated using the cryptographic key.

12. The system of claim 5, wherein the verification includes determining whether information resulting from a process for establishing the cryptographically protected communications session matches a parameter associated with the message.

13. The system of claim 5, wherein processing the message is dependent upon successful verification that the message was transmitted over the cryptographically protected communications session.

14. A non-transitory computer-readable storage medium having stored thereon executable instructions that, if executed by one or more processors of a computer system, cause the computer system to at least:
receive, over an established cryptographically protected communications session, a message and a digital signature;

verify, based at least in part on the message, a cryptographic key obtained after establishment of the established cryptographically protected communications session, and the digital signature, whether the message was transmitted over the established cryptographically protected communications session; and indicate whether the message was transmitted over the established cryptographically protected communications session.

15. The non-transitory computer-readable storage medium of claim 14, wherein establishment of the cryptographically protected communications session includes using a handshake protocol for a cryptographic protocol.

16. The non-transitory computer-readable storage medium of claim 15, wherein the cryptographic key is obtained outside of a handshake process establishing the cryptographically protected communications session.

17. The non-transitory computer-readable storage medium of claim 15, wherein the instructions further comprise instructions that, if executed by the one or more processors, cause the computer system to perform one or more mitigating actions based on an indication that the message was received over a different cryptographically protected communications session.

18. The non-transitory computer-readable storage medium of claim 14, wherein the instructions further comprise instructions that, if executed by the one or more processors, cause the computer system to determine information usable to distinguish the established cryptographically protected communications session from a different cryptographically protected communications session.

19. The non-transitory computer-readable storage medium of claim 18, wherein the information usable to distinguish the established cryptographically protected communications session is determined based at least in part on a digital certificate used to establish the cryptographically protected communications session.

20. The non-transitory computer-readable storage medium of claim 18, wherein the verification includes determining whether the information usable to distinguish the established cryptographically protected communications session matches a parameter associated with the message.

* * * * *